United States Patent [19]

McKee

[11] Patent Number: 5,542,589
[45] Date of Patent: Aug. 6, 1996

[54] DESK STRUCTURE FOR VEHICLES

[76] Inventor: Carl B. McKee, 29971 Homedale, New Hudson, Mich. 48165

[21] Appl. No.: 303,951

[22] Filed: Sep. 9, 1994

Related U.S. Application Data

[63] Continuation-in-part of Ser. No. 941,537, Sep. 8, 1992, abandoned.

[51] Int. Cl.$^6$ .................................................. B60R 7/00
[52] U.S. Cl. ..................... 224/275; 224/277; 224/929; 296/37.15; 455/344; 455/346; 455/345; 455/351; 379/58; 379/428; 379/440
[58] Field of Search .................................. 224/275, 929, 224/273, 277; 455/89, 90, 344, 345, 346, 351; 296/37.1, 37.8, 37.15; 379/58, 428, 437, 440

[56] References Cited

U.S. PATENT DOCUMENTS

| | | | |
|---|---|---|---|
| 3,873,010 | 3/1975 | Patterson | 224/275 |
| 4,061,971 | 12/1977 | Barrons | 455/90 |
| 4,842,174 | 6/1989 | Sheppard et al. | 224/273 |
| 4,842,235 | 6/1989 | Brown et al. | 248/447.2 |
| 4,946,120 | 8/1990 | Hatcher | 248/183 |
| 5,007,569 | 4/1991 | Zarb | 224/275 |
| 5,071,049 | 12/1991 | Mozer | 224/277 |
| 5,085,153 | 2/1992 | McKee | 108/44 |
| 5,111,360 | 5/1992 | Baba | 455/351 |
| 5,205,452 | 4/1993 | Mankey | 224/275 |
| 5,209,386 | 5/1993 | Allison | 224/275 |
| 5,397,160 | 3/1995 | Landry | 224/929 |
| 5,418,836 | 5/1995 | Yazaki | 379/58 |

FOREIGN PATENT DOCUMENTS 9008671  8/1990  Australia .......................... 296/37.15

*Primary Examiner*—Henry J. Recla
*Assistant Examiner*—Timothy L. Maust
*Attorney, Agent, or Firm*—Howard & Howard ATTY.

[57] ABSTRACT

A readily transportable desk structure is provided for positioning upon a vehicular seat of the bench type. The desk structure preferably takes the form of an tub-like body having a compartment housing transceiver means and a plate-like top covering the compartment with a cover providing access to the compartment. Various means are disclosed for preventing excessive verticle and horizontal movement of the desk stucture during vehicular travel utilizing the vehicle seat belt, the center armrest, the seat cushion and the seat back. A power outlet is provided for utilizing electrically powered accessories with the desk stucture.

20 Claims, 7 Drawing Sheets

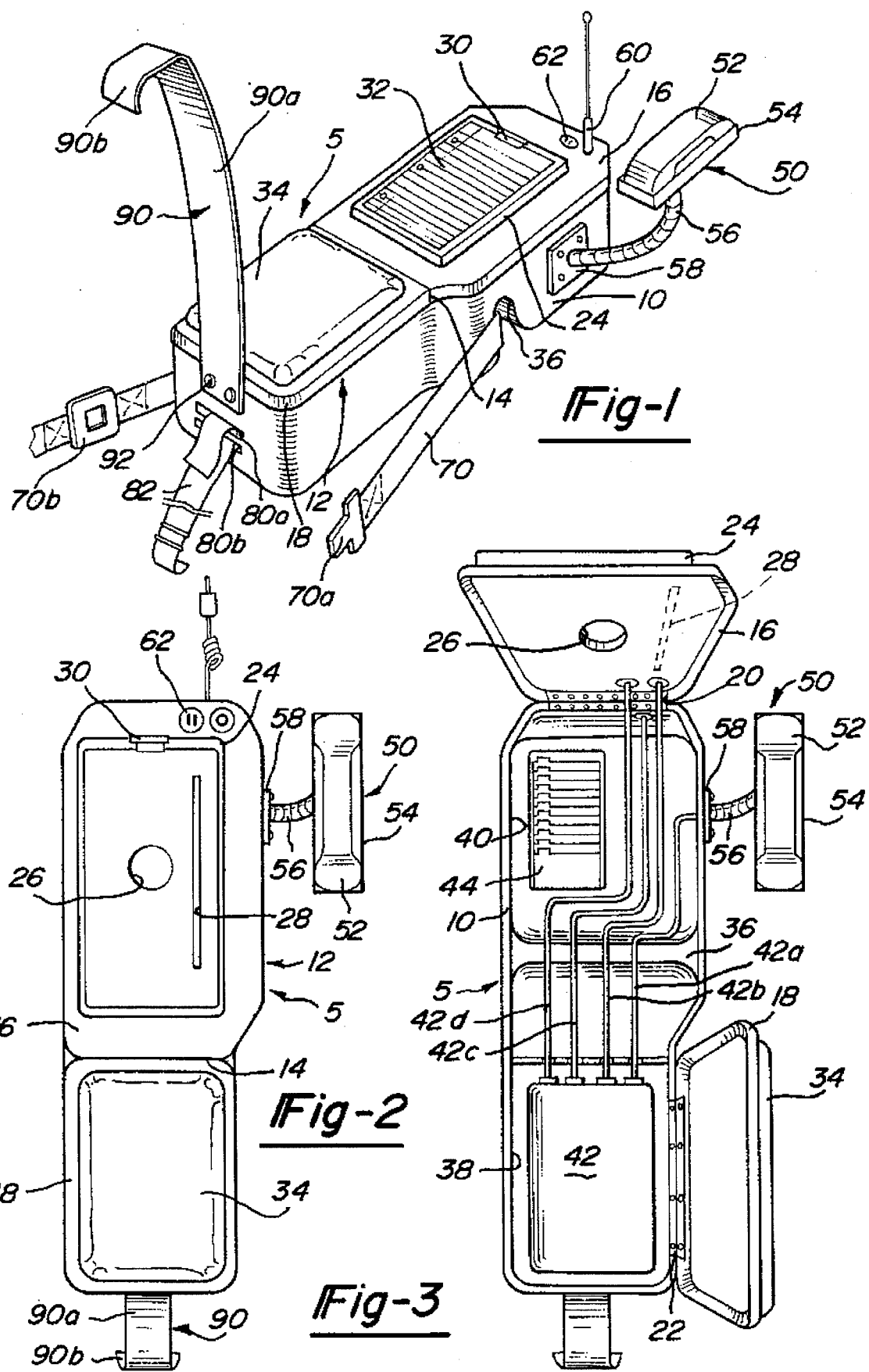

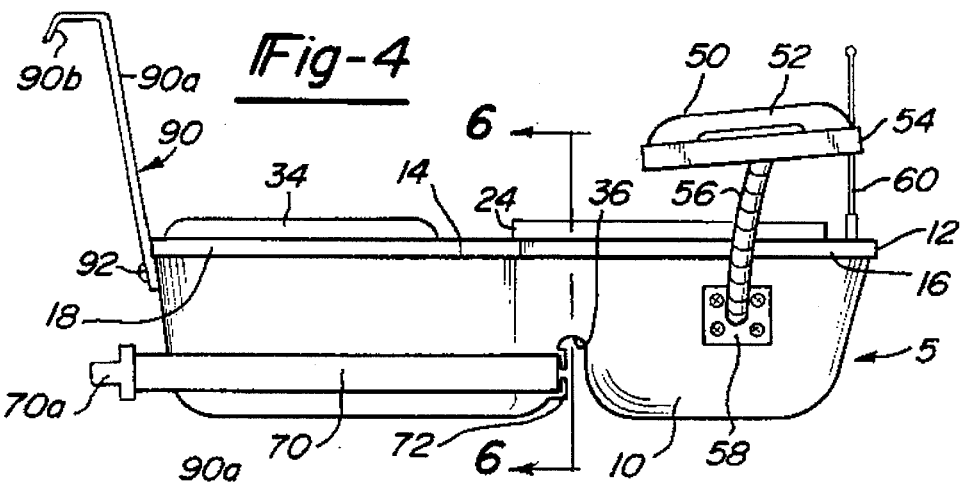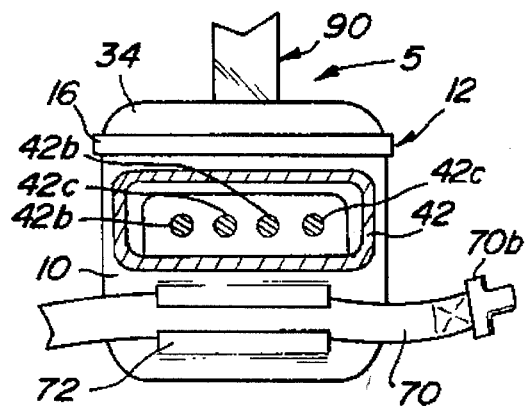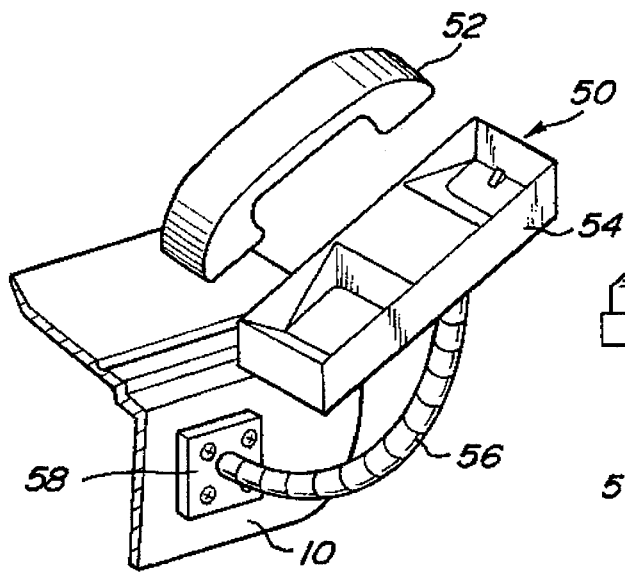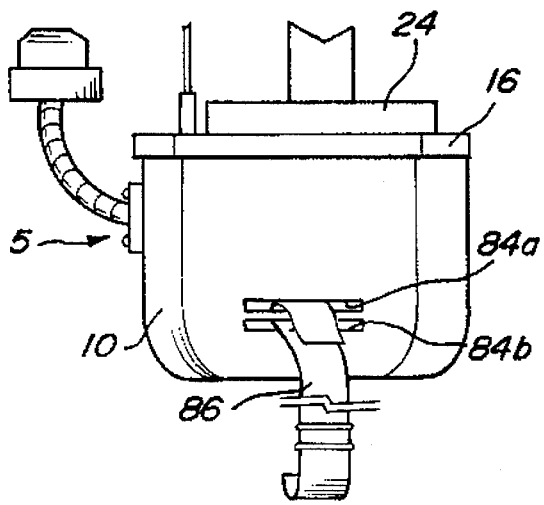

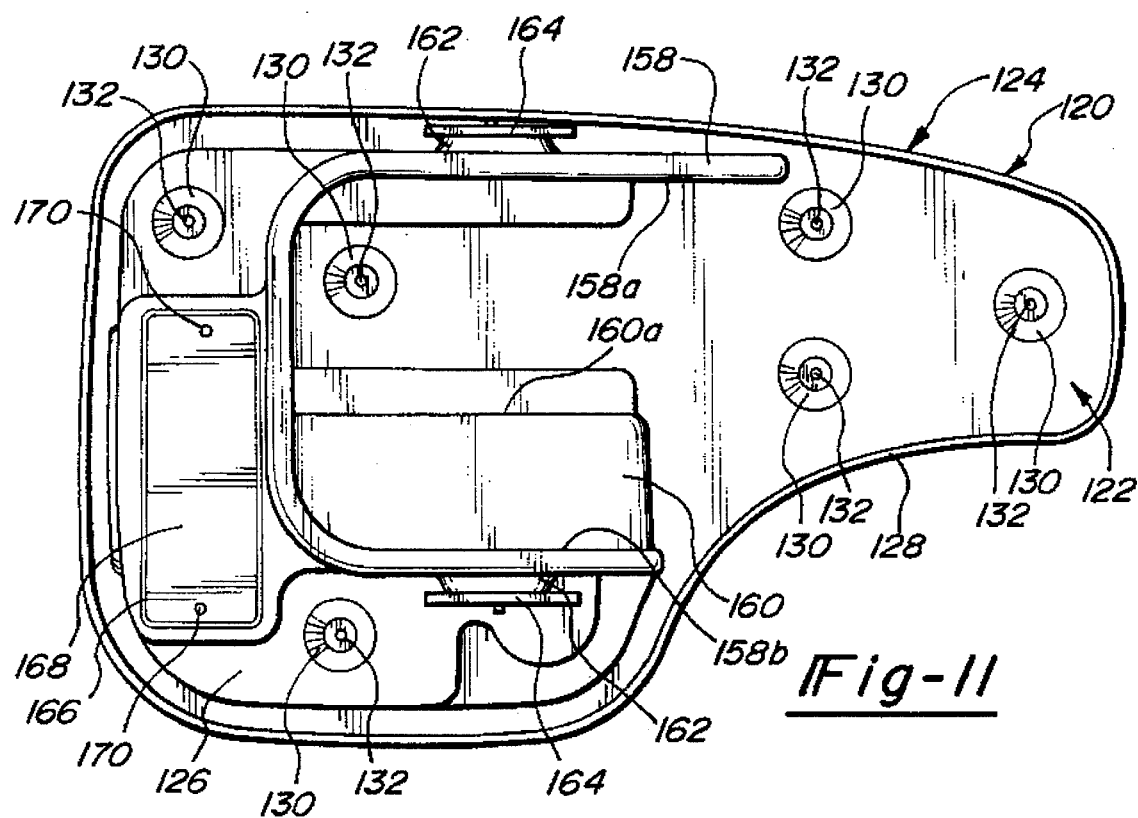
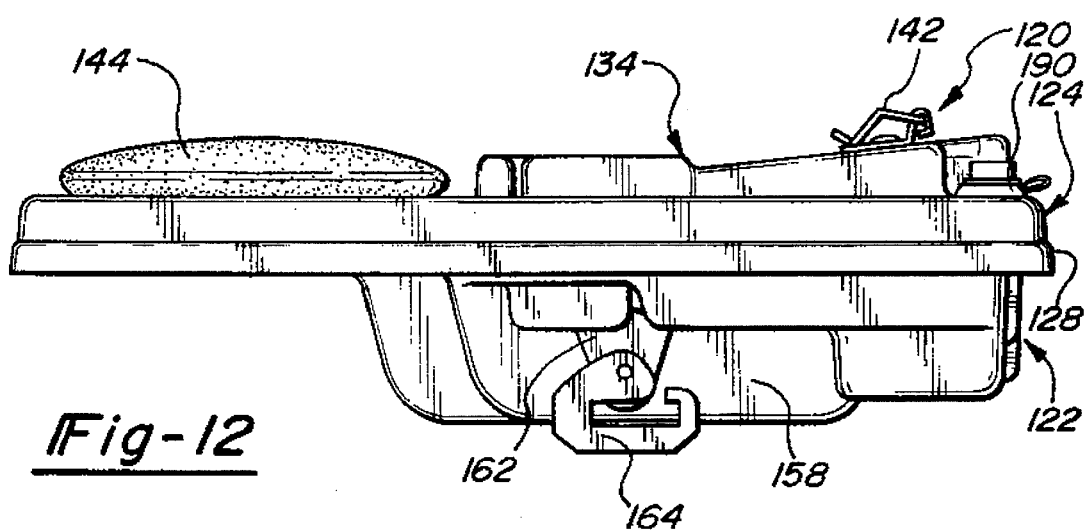

5,542,589

1

DESK STRUCTURE FOR VEHICLES

This is a continuation-in-part of application Ser. No. 07/941,537 filed on Sep. 8, 1992 now abandoned.

BACKGROUND OF THE INVENTION

The present invention relates generally to desks and, in particular, to a portable desk apparatus for use in vehicles.

Many devices are known for providing a driver and/or passenger in a vehicle access to various objects such as a note pad, a drink container, a cellular telephone, business files, etc. Generally, these devices are mounted either on the dashboard of the vehicle, upon the front seat of the vehicle, or straddling the transmission/drive shaft hump in the front floor of the vehicle. For example, there is shown in the U.S. Pat. No. 2,934,391 an automobile desk that is supported at a forward end on the floor of a vehicle by a pair of adjustable length legs and at a rearward end on the bench seat cushion.

The U.S. Pat. No. 3,909,092 shows an integrally molded one-piece portable console with a back portion that rests on the automobile seat and a depending front portion that extends downwardly over the front of the seat and rests on the drive shaft tunnel of the automobile.

The U.S. Pat. No. 4,417,764 shows an armrest for a vehicle including a drawer having a holder for different types and sizes of beverage containers and a slide with recesses for holding a writing instrument and writing media.

The U.S. Pat. No. 5,071,049 shows a mobile telephone console for mounting on the transmission hump of a vehicle and including a writing table extending on an arm from the side from the console body.

The U.S. Pat. No. 5,085,153 shows a desk structure for removable mounting on a front arm rest of a vehicle. The described desk structure comprises a generally box-like base framework fixedly mounting thereon a substantially flat top member provided with a plurality of cavities for receiving such objects as a writing tablet, cushion means, and mobile telephone or other communication apparatus.

SUMMARY OF THE INVENTION

The present invention concerns a desk structure for use inside and outside a vehicle and adapted to be removably positioned upon a vehicle seat for use inside the vehicle. The desk structure includes a generally hollow tub-like body having an open upper side, a front wall having an aperture formed therein, a generally planar bottom wall adapted to rest on a generally horizontal surface of a vehicle seat and an interior compartment for housing a telephone transceiver means. A generally plate-like top attached to the body covering the open side and has means for providing access to the interior compartment for installing and removing the telephone transceiver means. A means for mounting a telephone handset is attached to one of the body and the top. An electrical conduit means is mounted in the body for connecting the telephone transceiver means housed in the compartment to a source of electrical power remote from the body, the electrical conduit means having one end extending through the aperture and being connected to a plug for detachably connecting the electrical conduit means to a source of power external to the body and an opposite end for connection to the telephone transceiver means. A restraint means is attached to the body and adapted to releasably engage at least one of a portion of the vehicle seat and a vehicle seat belt to limit horizontal and vertical movement of the desk structure when the desk structure is positioned upon the generally horizontal surface of the vehicle seat.

Each of the vehicles noted equipped with bench seats provides an environment for effective utilization of the desk structure of the present invention. The present provides a readily portable and highly versatile desk structure responsive to the comfort and office needs of an active traveler, featuring the combination of a thermoformed multi-purpose desk mounting thereon a mobile telephone and housing transceiver means for said telephone.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a perspective view of the desk structure of the present invention;

FIG. 2 is a top plan view of the desk structure shown in the FIG. 1;

FIG. 3 is a view similar to that of the FIG. 2, but with the top portion of the desk structure open showing the interior of the desk body portion;

FIG. 4 is an elevational view of the right side of the desk structure shown in the FIG. 1;

FIG. 5 is an elevational view of the rear side of the desk structure shown in the FIG. 1;

FIG. 6 is a sectional view of the desk structure taken along the line 6—6 in the FIG. 4;

FIG. 7 is an enlarged fragmentary perspective view of the mounting means for a mobile telephone included in the desk structure shown in the FIG. 1;

FIG. 8 is an elevational view of the front side of the desk structure shown in the FIG. 1;

FIG. 11 is a bottom plan view of the desk structure shown in the FIG. 10;

FIG. 12 is an elevational view of the right side of the desk structure shown in the FIG. 10;

DESCRIPTION OF THE PREFERRED EMBODIMENT

Figure 9:
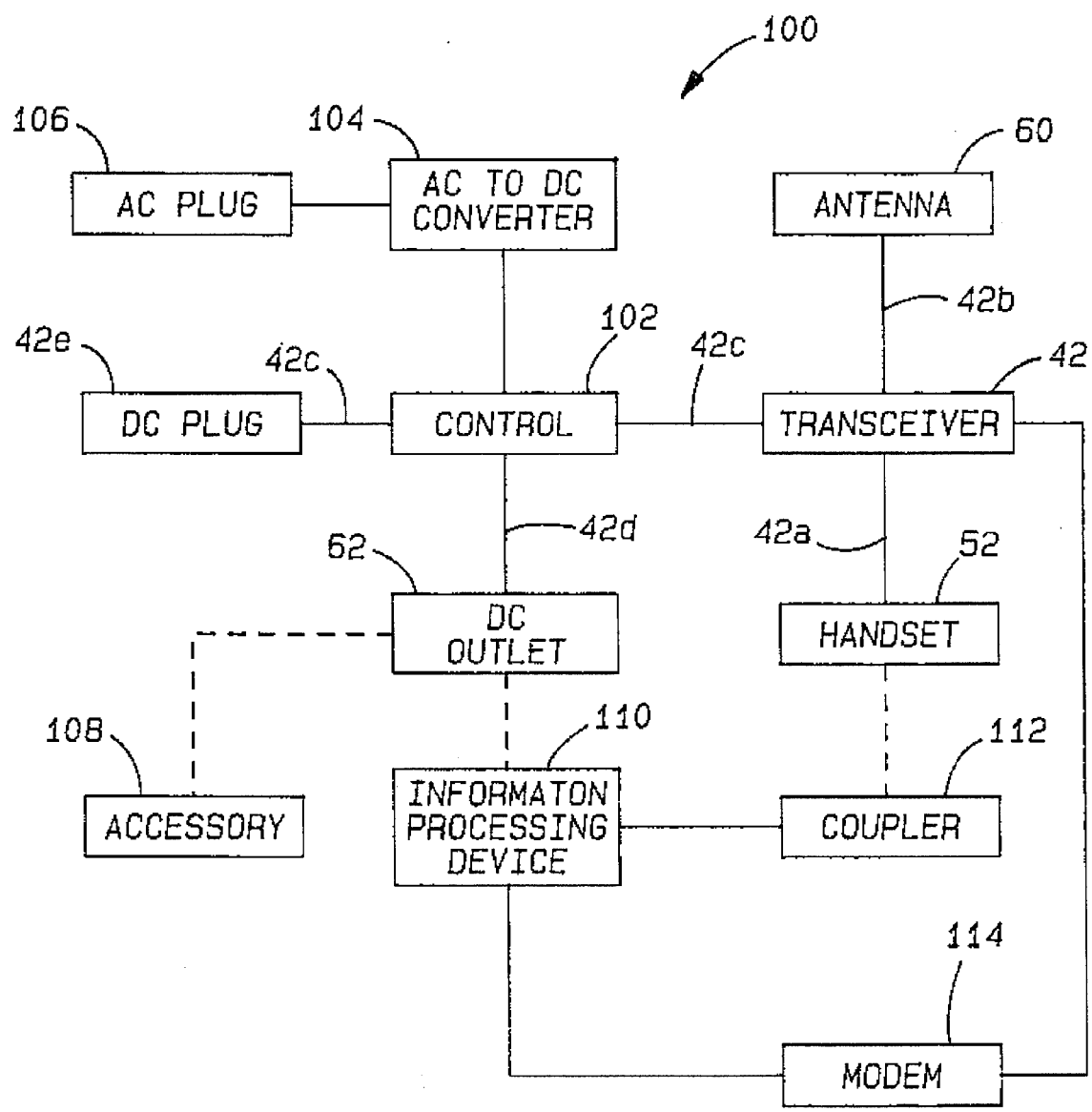
FIG. 9 is schematic block diagram of the electrical circuit of the desk structure shown in the FIG. 1.

There is shown in the FIGS. 1–4 a desk structure 5 which can be formed by any suitable method, such as thermoforming, to include a tub-like base or body portion 10 capped by a plate-like top portion 12. The top portion 12 conforms generally to the outline of the generally rectangular and substantially hollow base portion 10. The top portion 12 is transversely split or divided, as at 14, to provide a pair of cover members 16 and 18. The cover member 16 can be connected at a forward edge thereof by a hinge means 20 to the base portion 10, and a hinge means 22 can be employed to connect a side edge of the cover member 18 to the base portion. Of course, the cover members 16 and 18 can be attached to the base or body portion 10 by any other suitable means such as Velcro brand fasteners, or by snap fitting engagement therewith.

The base portion 10 and the cover portion 12 can be formed of a thermoplastic polymer material, and a presently preferred material is ABS resin (acrylonitrile-butadiene-styrene copolymer). Thermoforming is the presently preferred technique. Other thermoplastic resins and forming methods such as injection molding are of course within the scope of the present invention.

Preferably integrally formed with the cover member 16 on an upper surface thereof is a generally rectangular raised portion 24 apertured as at 26 to receive therein a beverage container (not shown), and provided with an elongated cavity 28 to accommodate a writing implement (not shown). A clip means 30 is secured to a forward edge of the raised portion 24 and receives therein a writing tablet or pad 32 (shown only in the FIG. 1 ). Of course, the writing pad 32 is normally removed when a beverage container is seated in the opening 26. If desired, means can be provided whereby the pad 32 is slidable relative to the raised portion 24, thereby exposing the opening 26 and the cavity 28. As well, the raised portion 24 can be inclined upwardly from rear to front to facilitate use of the pad 32.

The cover member 18 preferably has mounted on an upper surface thereof a cushion means 34 for resting a person's forearm. This provides comfort to the driver while writing on the pad 32, and at other times when utilizing the desk structure 5 of this invention.

It is believed that a significant, and heretofore unsatisfied, need exists in the art for a readily portable and structurally simplified multi-purpose desk structure mounting a readily accessible mobile telephone activated by transceiver means entirely housed within the body of the desk structure. The novel combination of a multi-purpose desk mounting a cellular telephone and housing the transceiver therefor importantly permits performance of normal office functions while traveling within a vehicle, while also permitting ready transfer of the desk in its entirety to a less mobile location such as a home or office, whereat generally the same office functions can be performed at ease without significant desk modification. In effect, by this invention there is provided a highly efficient desk structure which features ready trans-portability between mobile and non-mobile locations, and further in each location providing multi-functionality.

Referring now again to the drawings, the tub-like body portion 10 during the thermoforming process can be shaped to include an indentation or cavity in a bottom surface thereof, the cavity being inwardly directed and transversely extending to form a wall 36 (FIGS. 1 and 4) in the interior of the body portion as the bottom surface extends upwardly. The wall 36 divides the interior of the body portion 10 into a pair of compartments 38 and 40 (FIG. 3) each having an open top. As is believed now apparent, the compartments 38 and 40 are closed when the cover members 18 and 16, respectively, are in the down position shown in the FIGS. 1, 2 and 4.

The compartment 38 is dimensioned to house a transceiver means 42, maintained in a substantially rigid position by any suitable fastening means. The compartment 40 provides a convenient location for a card index file 44, which can be of the type identified by the Rolodex trademark. The compartment 40 can, of course, house other accessories of convenience for the vehicle operator or passengers.

As shown in the FIG. 7, exteriorly of the body portion 12 and mounted at a predetermined location on a side thereof is a mobile or cellular telephone apparatus 50. The telephone apparatus 50 comprises a handset 52 and stand or cradle 54, the latter being connected by flexible cable means 56 and bracket means 58 to the body portion 10. Other means can of course be employed to support the telephone apparatus 50 upon the desk housing 10, as for example, the stand 54 can be mounted directly thereon. As well, the telephone apparatus 50 can be positioned at different location, such as upon the table top member 12.

The location of the telephone apparatus 50, and the general dimensions of the desk structure 5 are dictated or governed in large measure by human engineering or ergonomics. The characteristics of people, exemplified by the average operator or driver, were considered in designing the total desk structure and arrangement of accessories to be positioned thereon, in order that people and the present invention interact most effectively and safely. Consideration of the concept of ergonomics does not appear to be manifest in the prior art desk structures discussed above.

The significant portability feature of the desk structure 5 of the present invention is attributed in large measure to the transceiver 42. In comparison therewith, substantial drilling and wiring of the vehicle has heretofore been required, together with an antenna exteriorly mounted on the vehicle. Not only has substantial skilled labor been required, but additionally there is the presence of unsightly wiring within the vehicle, and the possibility of theft of the exterior antenna.

The transceiver 42 can be one of many commercially available units, and one which has functioned well in the present invention is identified as Model No. 52712A by it manufacturer, Motorola, Inc. This particular model has a power output of three watts.

The transceiver 42 has electrically connected thereto a plurality of electrical lines or conduit means, identified by the numerals 42a, 42b, 42c, and 42d in the FIGS. 3 and 6. The conduit means 42a is connected through the cable means 56 to the stand 54 of the mobile telephone apparatus 50, and the conduit means 42b is electrically wired to an antenna means 60 supported by the cover 16 hingedly connected to the top portion 12. Although the handset 52 is shown as being of the wireless type, it can be of the type which is wired to the cradle 54 and connected to the conduit means 42a. The conduit means 42c, on the other hand, includes a plug 42e attached to a free end thereof which plug can be detachably and electrically connected to a direct current power source, which can be the cigarette lighter socket (not shown) mounted on vehicle structure and electrically connected to the twelve volt battery in the vehicle. The conduit means 42d is connected to an electrical outlet 62 mounted in the cover 16 to supply direct current power to an accessory such as a reading lamp (not shown) to provide illumination as required for the pad 32, or for performance of other tasks requiring additional illumination, as at night. Of course, within the capabilities of the transceiver means 42, more than the indicated four connections thereto can be provided.

By reason primarily of its ready portability, the compact desk structure 5 of this invention is relatively light in weight, and therefore would be subject to movement on the vehicle seat during travel of the vehicle. Accordingly, and to assure compliance with federal and/or state regulations dealing with this subject, the present invention provides an effective restraint system to assure relative immobility of the desk structure 5 during vehicular movement.

It is known that automobiles and the like provided with bench seats which can accommodate more than two persons must be equipped with center seat belts. This restraint means provides one manner of preventing excessive vertical and horizontal movement of the desk structure 5 during travel of the vehicle. Referring now particularly to the FIGS. 1, 4, and 6, a vehicular center seat or safety belt or strap means 70 is provided at opposite ends with a tongue means 70a and a buckle means 70b. The strap 70 engages the desk structure 5 through a slotted latch means 72 secured to or formed in an outer surface of the desk base portion 10 within the inwardly directed cavity which defines the wall 36.

As can now be recognized, other modes of significantly limiting horizontal and vertical movement of the desk structure of this invention, employing the vehicular center seat belt, can be employed. For example, a slotted D-ring such as is described below can be affixed to a wall of the desk body portion 10, and the center seat belt 70 passed therethrough. Other forms of restraint utilizing the center seat belt will become apparent to those skilled in the art.

Should it be found that other means for limiting vertical and horizontal movement of the desk structure 5 are desired, slot and belt means as shown in the FIGS. 1, 5, and 8 can be provided. Such restraining means are preferably engageable with opposite ends of the desk base portion 10. A pair of slot like openings 80a and 80b (FIG. 5) are formed in a rear wall of the body portion 10. A free end of a belt means 82 can be passed through the slots, and hook and loop material (not shown) can be used to secure the free end to form a loop. An opposite end of the belt means 82 is equipped with a hook means 82b engageable with a fixed vehicle structure (not shown), which can be the seat support.

Similarly, in the front wall (FIG. 8) of the desk base portion 10, a pair of slot like openings 84a and 84b can be provided. A free end of a belt means 86 is passed through the openings and attached, and connection to a fixed vehicle structure is made with the opposite end as previously described.

A further means for limiting or substantially preventing vertical and horizontal movement of the desk structure 5, particularly when the vehicle is in motion, can take the form of the brace means 90 shown in the FIGS. 1, 4, and 5. This form of restraint comprises a relatively rigid elongated band portion 90a shaped at an upper end thereof to include a hook portion 90b. An opposite lower end of the band portion 90a of the brace means 90 is fixedly secured to the desk body portion 10 by a fastening means 92 such as rivets. The brace means 90, by provision of hook portion 90b thereon, is particularly well suited to engage the upper portion of the seat back of a front or rear bench seat, whether of the split or non-split type. Currently, trucks of various types provide an environment well-adapted to utilization of a brace means restrained-desk structure, with or without the various forms of belt means herein disclosed for substantially entirely preventing excessive vertical and/or horizontal movement of the desk structure while the vehicle is in motion. As is now believed apparent, all forms of belt restraint means heretofore discussed have in common attachment to a fixed vehicular structure.

It was noted above that the desk structure 5 herein disclosed has particular utility when used with a vehicular bench seat of the split or non-split type. Such seats are comprised of a seat cushion and seat back and, of course, the desk structure rests upon the upwardly facing cushion portion, and may or may not be in contact with the seat back. The desk structure 5 can be employed with success on either the front or back seat of the vehicle.

An electrical circuit 100 of the present invention will now be discussed in more detail with reference to the schematic block diagram shown in the FIG. 9. As discussed above, the transceiver 42 is connected by the conduit means 42a to the handset 52 and is connected to the antenna 60 through the conduit means 42b. The transceiver 42 also is connected by the conduit means 42c to the direct current (DC) plug 42e.

The transceiver 42 also can be connected by the conduit means 42d to the direct current (DC) outlet 62 as shown in the FIG. 3. However, the electrical circuit 100 also can include a control 102 connected in series in the conduit 42c. The control 102 has a first input connected to the plug 42e and a first outlet connected to the transceiver 42. The control 102 also has a second input connected to an output of an alternating current (AC) to direct current (DC) converter 104. The converter 104 has an input connected to an alternating current (AC) plug 106. The control 102 can include switching means which permits switching between a source of direct current power connected to the plug 42e and a source of alternating current power connected to the plug 106 such as the electrical power utilized in homes and offices. In addition, the control 102 has a second output connected to the conduit means 42d which substitutes for the previously shown connection of the conduit means 42d to the transceiver 42. Thus, the desk structure 5 having the electrical circuit 100 can be utilized in a vehicle which has a source of direct current power and in a location which has a source of alternating current power.

As stated above, an accessory 108 such as a lamp can be plugged into the outlet 62 to receive DC power therefrom. The electrical connection between the outlet 62 and the accessory 108 is shown as a dashed line to represent a detachable mechanical connection such as plug connected to the accessory 108 and inserted into the outlet 62. The outlet 62 also can be utilized to provide electrical power to an information processing device 110. The information processing device 110 can be a portable computer, an electronic organizer, a facsimile machine, a calculator, another telephone, a printer, or any similar device which utilizes direct current power for the operation thereof. If the device 110 has a battery, the outlet also can be utilized for recharging the battery.

The information processing device 110 can exchange information through the transceiver 42. For example, an input-output of the device 110 can be connected to an input-output of a coupler 112. The coupler 112 can be an acoustically operated device which is placed adjacent the handset 52 to convert information in electronic form to acoustic form for the transmission of information from the device 110 through the handset 52, the transceiver 42 and the antenna 60. Furthermore, information received in electronic form through the antenna 60, the transceiver 42 and the handset 52 is converted to acoustic form by the handset 52 and is converted back to electric form by the coupler 112 before entering the device 110. Many information processing devices also either incorporate or can be connected to a modem 114 which can be electrically connected to the transceiver 42 for exchanging information.

There is shown in the FIGS. 10–14 an alternate embodiment desk structure 120 in accordance with the present invention. The desk structure 120 includes a substantially hollow tub-like base or body portion 122 capped by a plate-like top portion 124. The body portion 122 is generally rectangular in planar view with an inwardly curved cutout portion 126 (FIG. 11) formed at a right rear corner thereof. The top portion 124 includes a downwardly extending peripheral flange 128 and conforms generally to the outline of the body portion 122 with the flange 128 overlapping the upper edge of the body portion. As best shown in the FIG. 11, a plurality of upwardly extending depressions 130, each having a central aperture, are formed in a bottom surface of the body portion 122. The top portion 124 is attached to the body portion 122 by a plurality of fasteners 132 such as plastic rivets which are retained in apertures (not shown) in the top portion 124 and extend into the apertures in the depressions 130.

Preferably integrally formed with an upper surface of the top portion 124 is a generally rectangular raised portion 134 having a generally circular cavity 136 formed in a right hand area thereof to receive therein a beverage container (not shown). Forward of the cavity 136 is a generally rectangular cavity 138 formed in the upper surface of the top portion 124 for use as a storage bin. A central area of the raised portion 134 is provided with a plurality of elongated cavities 140 to accommodate writing implements (not shown). A clip means 142 is secured to a forward edge in the central area of the raised portion 134 for retaining an upper edge of a writing tablet or pad (not shown) such as the pad 32 shown in the FIG. 1. Of course, the pad will cover and retain any writing implements in the cavities 140 and a lower edge of the pad can be raised to reveal the cavities 140 for removal of the writing implements. As shown, the raised portion 134 is inclined upwardly from rear to front to facilitate use of the pad.

The top portion 124 preferably has mounted on a rear area of the upper surface thereof a cushion means 144 for resting a person's forearm. This provides comfort to the driver while writing on the pad, and at other times when utilizing the desk structure 120 of this invention.

Figure 10:
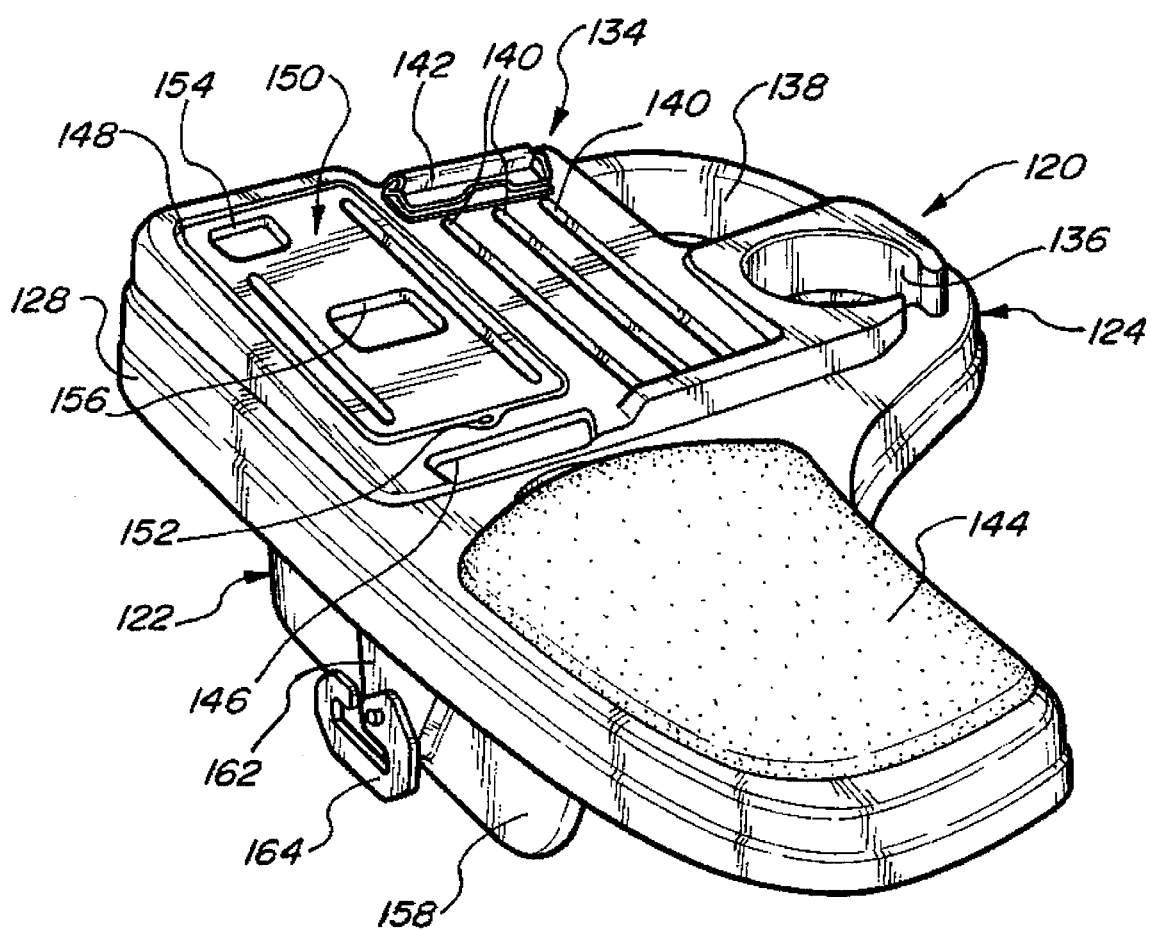
FIG. 10 is a perspective view of an alternate embodiment of the desk structure of the present invention.
Figure 13:
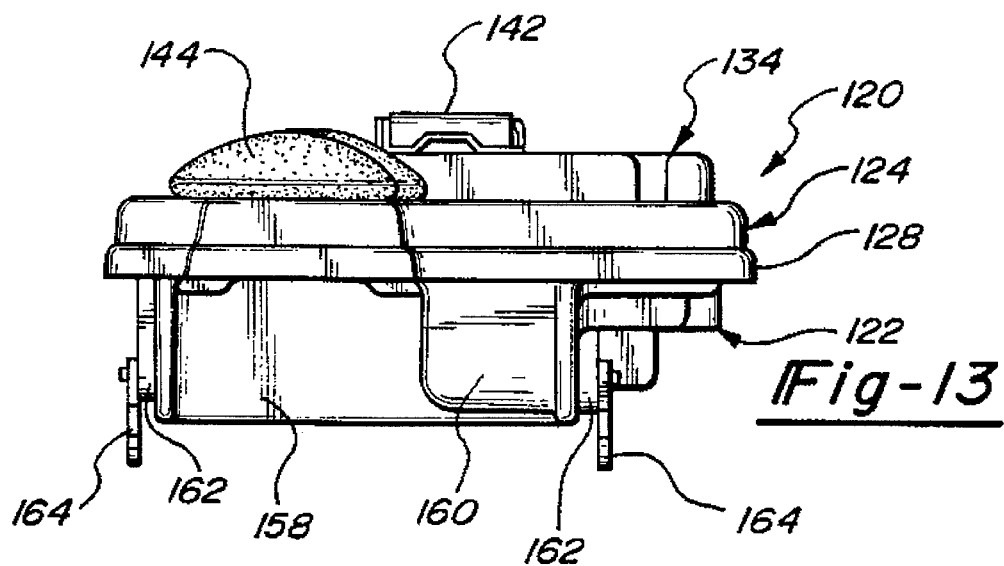
FIG. 13 is an elevational view of the rear side of the desk structure shown in the FIG. 10.

A left hand area of the raised portion 134 has a shallow cavity 146 formed at a rear edge thereof (FIG. 10). The cavity 146 can retain a name or identification plate (not shown) which can be attached therein by any suitable means such as an adhesive. Also formed in the left hand area of the raised portion 134 is a generally rectangular aperture 148 which provides access to the interior of the desk structure 120. The aperture 148 is closed by a removable transceiver cover 150. The transceiver cover 150 can be attached to the top portion 124 by any suitable means such as a fastener 152 at a rear edge thereof and a tab (not shown) at a front edge thereof. The aperture 148 and the transceiver cover 150 provide access to the interior of the desk structure 120 for installing and removing a transceiver (not shown) such as the transceiver 42 shown in the FIG. 3. The transceiver cover 150 has a generally rectangular first aperture 154 formed adjacent a front edge thereof through which an antenna (not shown) can be extended. The cover 150 also has a second aperture 156 formed in a central area thereof over which a mobile telephone stand or cradle (not shown) can be mounted and through which wiring can be extended. Thus, the desk structure 120 provides means by which a mobile telephone, a writing pad and writing implements, a beverage container and various loose items can be readily accessed and utilized by a driver and/or passengers when the desk structure is mounted on a seat of a vehicle.

The body portion 122 can be provided with a generally U-shaped wall 158 which is open at a rear side thereof and extends downwardly from the bottom surface of the body portion. Opposite inner surfaces 158a and 158b of portions of the wall 158 extending forward from the opening are spaced apart a distance which corresponds to a width of a wider center armrest portion of a bench seat of a vehicle. Thus, the desk structure 120 can be removably mounted on such an armrest which is in a down position and such armrest will prevent the desk structure from moving sideways on the vehicle seat. When the desk structure 120 is to be installed upon a narrower armrest, the body portion 122 is formed with a spacer portion 160 whereby the bottom surface of the body portion is extended downwardly and inwardly from the inner surface 158b to provide a reduced space between the inner surface 158a and an opposing surface 160a. For example, the distance between the surface 160a and the surface 158a can be approximately five and one-half inches in order to accommodate most single armrests in vehicles. The spacer portion 160 can be eliminated to provide a distance between the opposing inner surfaces 158a and 158b of approximately nine inches to accommodate larger armrests or dual armrest installations.

Formed on an exterior surface of the wall 158 on opposite sides of the body portion 122 is a pair of outwardly extending bosses 162. A D-ring 164 is rotatably mounted on each of the bosses 162 for engaging a seat belt of the vehicle such as the seat belt 70 shown in the FIG. 1. Thus, the seat belt 70 can be threaded through the D-rings 164 and beneath the armrest to securely fix the desk structure 120 both on the armrest and with respect to the vehicle seat.

Formed in a forward area of the bottom surface of the body portion 124 is an aperture 166 for providing access to the interior of the desk structure 120. The aperture 166 is closed by a wiring cover 168 which is removably attached by suitable means such as a pair of fasteners 170. As will be described below, the aperture 166 provides access to the interior of the desk structure 120 for connecting a wiring harness. The base portion 122, the top portion 124, the cover 150 and the cover 168 can be formed of a thermoplastic polymer material any suitable technique.

Figure 14:
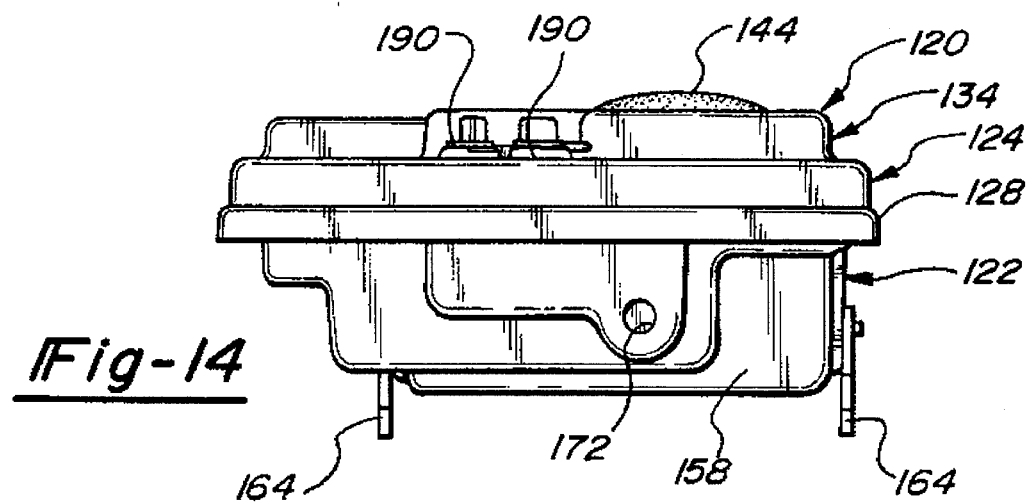
FIG. 14 is an elevational view of the front side of the desk structure shown in the FIG. 10.
Figure 15:
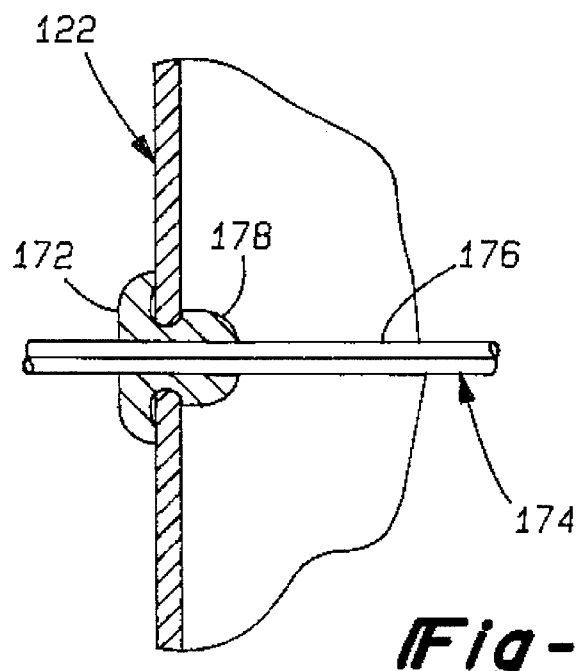
FIG. 15 is an enlarged fragmentary sectional view of the desk structure shown in the FIG. 10 including a portion of a wiring harness.

In the FIG. 14, there is shown an aperture 172 formed in a front wall of the body portion 122. The aperture 172 and a portion of an electrical conduit means 174, such as a wiring harness, are shown in more detail in the FIG. 15. The wiring harness 174 includes a two conductor electrical cable 176 for providing direct current power to the desk structure 120. The cable 176 extends through the aperture 172 and is protected by a surrounding grommet 178 which engages the edges of the aperture 172.

Figure 16:
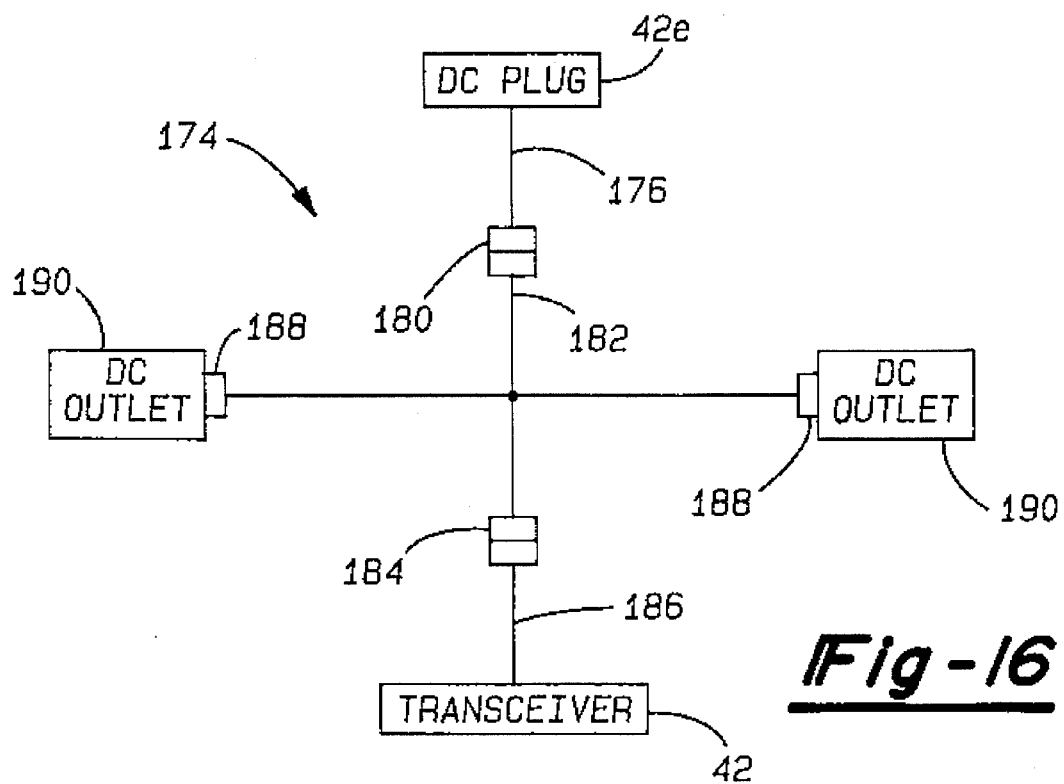
FIG. 16 is schematic block diagram of the wiring harness shown in the FIG. 14.

As shown in the FIG. 16, the wiring harness 174 has one end of the cable 176 connected to the DC plug 42e. An opposite end of the cable is connected to a female half of an electrical connector 180. A male half of the connector 180 is connected to a two wire cable 182 which branches in three directions. One branch of the cable 182 is connected to a female half of an electrical connector 184. A male half of the connector 184 is connected to one end of a two wire cable 186 which has an opposite end electrically connected to the transceiver 42. The other two branches of the cable 182 are each connected to a separate female electrical connector 188. The connectors 188 each engage male electrical terminals (not shown) on a corresponding one of a pair of DC outlets 190. As shown in the FIGS. 12 and 14, the outlets 190 are mounted in the top portion 124 adjacent the front edge of the central area of the raised portion 134.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A desk structure for use inside and outside a vehicle and adapted to be removably positioned upon a vehicle seat for use inside the vehicle, said desk structure comprising:

a generally hollow tub-like body having an exterior surface, an open upper side, a front wall having an aperture formed therein, a generally planar bottom wall adapted to rest on a generally horizontal surface of a vehicle seat and an interior compartment for housing a telephone transceiver means;

a generally plate-like top attached to said body and covering said open side, said top having an exterior surface and means for providing access to said interior compartment for installing and removing the telephone transceiver means;

a means for mounting a telephone handset cradle on said exterior surface of one of said body and said top for releasably retaining a telephone handset;

an electrical conduit means mounted in said body for connecting the telephone transceiver means housed in said compartment to a source of electrical power remote from said body, said electrical conduit means having one end extending through said aperture and being connected to a plug for detachably connecting said electrical conduit means to a source of power external to said body and an opposite end for connection to the telephone transceiver means; and a restraint means attached to said body and adapted to releasably engage at least one of a portion of the vehicle seat and a vehicle seat belt to limit horizontal and vertical movement of said desk structure when said desk structure is positioned upon the generally horizontal surface of the vehicle seat.

2. The desk structure according to claim 1 wherein said means for providing access includes a cover attached to one of said body and said top.

3. The desk structure according to claim 2 wherein said cover is attached to said body by hinge means.

4. The desk structure according to claim 2 wherein said top has an aperture formed therein and said cover is attached to said top by fastener means to cover said aperture.

5. The desk structure according to claim 1 wherein said top includes a pair of cover members attached to said body by hinge means, one of said covers having a surface for supporting a removable writing tablet and another of said covers having a cushion means mounted thereon.

6. The desk structure according to claim 1 wherein said top includes a raised portion having a surface for supporting a removable writing tablet.

7. The desk structure according to claim 1 wherein said top includes an elongated cavity formed in an upper surface thereof for retaining a writing implement.

8. The desk structure according to claim 1 wherein said top includes an aperture formed in an upper surface thereof for retaining a beverage container.

9. The desk structure according to claim 1 wherein said top includes a generally circular cavity formed in an upper surface thereof for retaining a beverage container.

10. The desk structure according to claim 1 wherein said top includes a generally rectangular cavity formed in an upper surface thereof for retaining loose items.

11. The desk structure according to claim 1 wherein said restraint means is attached to and extends from said body and is adapted to releasably engage the vehicle seat belt.

12. The desk structure according to claim 11 wherein said restraint means includes slotted latch means attached to and extending from an exterior surface of said body and adapted to releasably engage the vehicle seat belt.

13. The desk structure according to claim 1 wherein said restraint means includes at least one pair of slotted openings formed in one of the front wall and a rear wall of said body, a belt means extending through said slotted openings and a hook means attached to said belt means and adapted to releasably engage the vehicle seat.

14. The desk structure according to claim 1 wherein said restraint means includes a brace means attached to said body and adapted to releasably engage a back portion of the vehicle seat, said brace means including at least one relatively rigid elongated band having one end attached to said body and a hook formed at an opposite end for engaging an upper portion of the seat back.

15. The desk structure according to claim 1 wherein said body includes an inwardly directed, transversely extending cavity formed in said bottom wall dividing said interior compartment from another compartment and said top includes a pair of cover members connected to said body by hinge means, each of said cover members covering an associated one of said compartments.

16. The desk structure according to claim 1 wherein said restraint means includes a generally downwardly extending U-shaped wail attached to said bottom wall of said body, said U-shaped wall being adapted to engage an armrest portion of the vehicle seat.

17. The desk structure according to claim 1 wherein said top is attached to said body by fastener means.

18. A desk structure for use inside and outside a vehicle and adapted to be removably positioned upon a vehicle seat; said desk structure comprising:

a generally hollow tub-like body portion having a top opening formed therein, a front wall with an aperture formed therein and a bottom wall for engaging a vehicle seat;

a plate-like top portion mounted on said body portion for closing said top opening and having a cover for providing selective access to an interior of said body portion;

a means for supporting a telephone handset attached to one of said top portion and said body portion;

a support surface formed on said top portion for retaining a writing pad;

a cushion means mounted on said top portion;

an electrical conduit means mounted in said body portion and adapted to be electrically connected between an electrical power source external to said desk structure and a telephone transceiver means in one of said compartments, said conduit means extending through said aperture in said front wall of said body portion; and a restraint means attached to said body portion and adapted to releasably engage at least one of the vehicle seat and a vehicle seat belt to limit horizontal and vertical movement of said desk structure when said desk structure is positioned upon the vehicle seat.

19. The desk structure according to claim 18 including a least one electrical outlet mounted on said top portion and electrically connected to said electrical conduit, said electrical outlet adapted to retain an electrical plug connected to an electrically powered device.

20. A desk structure with a telephone for use inside and outside a vehicle and adapted to be removably positioned upon a vehicle seat, said desk structure comprising:

a generally hollow tub-like body having an external surface and a compartment formed inside said body for housing a telephone transceiver means;

a plate-like top having an external surface and being attached to said body for covering said compartment;

a restraint means attached to said body and adapted to releasably engage at least one of a vehicle seat and a vehicle seat belt to limit horizontal and vertical movement of said desk structure when said desk structure is positioned upon the vehicle seat;

a telephone handset mounted on one of said external surface of said body and said external surface of said top;

a telephone transceiver means mounted in said compartment and electrically connected to said handset; and an electrical conduit means connected to said telephone transceiver means and having a plug for detachably connecting said telephone transceiver means to a source of electrical power external to said body.

* * * * *